(12) United States Patent
Cairns

(10) Patent No.: US 6,173,267 B1
(45) Date of Patent: Jan. 9, 2001

(54) METHOD FOR PRODUCT PROMOTION

(76) Inventor: Laurie Cairns, 10001 S. Greenwood Ave., Park Ridge, IL (US) 60068

( * ) Notice: Under 35 U.S.C. 154(b), the term of this patent shall be extended for 0 days.

(21) Appl. No.: 09/028,718

(22) Filed: Feb. 24, 1998

(51) Int. Cl.[7] .................................................. G06F 17/30
(52) U.S. Cl. .............................................. 705/14; 705/16
(58) Field of Search ......................................... 705/14, 16

(56) References Cited

U.S. PATENT DOCUMENTS

| | | | |
|---|---|---|---|
| 4,669,730 | 6/1987 | Small | 463/17 |
| 4,815,741 | 3/1989 | Small | 463/17 |
| 4,982,346 | 1/1991 | Girouard et al. | 705/14 |
| 5,149,202 * | 9/1992 | Dickert | 383/106 |
| 5,231,568 | 7/1993 | Cohen et al. | 463/17 |
| 5,249,044 | 9/1993 | Von Kohorn | 348/12 |
| 5,373,440 | 12/1994 | Cohen et al. | 705/14 |
| 5,431,274 | 7/1995 | Schaupp . | |
| 5,613,680 | 3/1997 | Groves et al. | 273/138.2 |
| 5,710,886 | 1/1998 | Christensen et al. | 705/14 |
| 5,729,693 * | 3/1998 | Holda-Fleck | 705/14 |
| 5,759,101 | 6/1998 | Von Kohorn | 463/40 |
| 5,774,870 | 6/1998 | Storey | 705/14 |
| 5,791,991 * | 8/1998 | Small | 463/41 |
| 5,806,043 * | 9/1998 | Toader | 705/14 |
| 5,809,481 | 9/1998 | Baron et al. | 705/14 |
| 5,883,620 | 3/1999 | Hobbs et al. | 345/168 |
| 5,893,075 | 4/1999 | Plainfield et al. | 705/14 |
| 5,907,830 | 5/1999 | Engel et al. | 705/14 |
| 5,916,024 | 6/1999 | Von Kohorn | 463/40 |
| 5,918,211 * | 6/1999 | Sloane | 705/16 |
| 5,970,469 | 10/1999 | Scroggie et al. | 705/14 |
| 5,983,196 | 11/1999 | Wendkos | 705/14 |
| 6,035,280 | 3/2000 | Christensen . | |

* cited by examiner

*Primary Examiner*—James P. Trammell
*Assistant Examiner*—John Leonard Young
(74) *Attorney, Agent, or Firm*—Quarles & Brady

(57) ABSTRACT

A method for providing fulfillment in a promotional contest includes providing a card in a product package marked with an internet address and a password. The purchaser of the product contacts the internet address and inputs personal information and the password to learn if the purchaser is a winner in the contest. If the purchaser is a winner, the card is sent to the company to verify the winning status before sending the prize to the purchaser.

22 Claims, 2 Drawing Sheets

METHOD FOR PRODUCT PROMOTION

BACKGROUND OF THE INVENTION

1. Field of the Invention

The present invention relates generally to a method for promoting or advertising a product, brand, service or company and, specifically, to a method for fulfillment of a promotional contest.

2. Description of the Related Art

Products offered for sale are often promoted by contests or sweepstakes. The possibility of winning a prize in the contest brings the product or company to the attention of potential customers and may prompt them to purchase the product. Contests thereby increase sales of the product or other products of the company and related products of other manufacturers as customers are driven to participate in the contest. The contest may be conducted so as to require the participants to submit personal information to the company or to the contest promoter. This personal information is useful to the company or promoter in determining the demographics of the customer base.

A company or promoter conducting a contest to promote a product must provide so-called fulfillment for the contest. Fulfillment refers to receiving the contest entries, checking the entries to determine which of the entries are winners, and recording the personal information about the participants and statistical information on the contest itself. These tasks becomes quite burdensome, particularly if the fulfillment tasks are performed by the company since additional personnel are required to assume these duties. Separate companies are often hired for contest fulfillment. This represents a considerable expense to the company hoping to promote its product. These costs reduce the benefits of running the contest, namely increased profits from higher sales.

Fulfillment is also required for rebates offered upon the purchase of a product. The purchaser of the product may, for example, be required to send a copy of the sales receipt, a portion of the product package, and personal information to the company to receive a rebate payment to effectively reduce the purchase price of the product. The burden on a seller of a popular product to fulfill these rebate requests is great, often resulting in delays that frustrate and anger the purchasers of the product, which counteracts the benefits of the goodwill generated by the rebate offer.

SUMMARY OF THE INVENTION

An object of the present invention is to provide a method for fulfillment of contests which reduces costs to the contest promoter and speeds up access to information gathered from the contest participants.

Another object of the invention is to provide secure self fulfillment of sweepstakes promotions.

Yet another object is to provide immediate responses to the contest participants on their winning status.

A further object of the invention is to provide a direct link between an internet based promotion, specifically a world wide web (WWW) based promotion, and a seller of the promoted product or service.

Another object of the invention is to provide useful information on the product with a goal of building brand loyalty.

These and other objects and advantages of the invention are provided by a method for sweepstakes fulfillment which provides an in-store delivery mechanism tied directly to the product and which directs purchasers or others to an internet site, such as a world wide web sweepstakes site. The in-store delivery mechanism is, for example, a card or other article available in a store, and in one embodiment is a card in a product package. Purchasers of the product retrieve the card from the product package and are directed to contact the world wide web sweepstakes site to learn if they are winners of the sweepstakes. While in contact with the world wide web site, the purchasers are asked to input information. The requested information includes a code or password or other unique information which is printed on or otherwise on the in-store delivery mechanism, as well as personal information of the purchaser. A promoter of the sweepstakes, specifically a server computer of the promoter, receives this information and determines whether the purchaser is among one or more winners of the sweepstakes from the code or other unique information. The purchaser is notified while connected to the world wide web site of his or her winning status. The purchaser may also obtain coupons or discounts, receive rebates, or play games such as a game promoting the product while visiting the web site. The winning status of the purchaser is confirmed by instructing the limited number of winning purchasers to forward their original cards to the promoter for verification.

Meanwhile, the server computer of the promoter has collected the personal information of the purchaser and accumulates this personal information into a database with personal information of other purchasers. The promoter of the sweepstakes or contest thereby obtains demographic data on the purchasers of the product without the expense of additional personnel or of hiring an outside service to perform this task. The sweepstakes entries are checked for winning status without the use of additional personnel to review each entry, providing a further cost savings. For the purchaser, the benefit is immediately knowing whether the entry is a winning entry or not.

The principles of the present method are applicable to a wide variety of contests and promotions. For example, present method may be used for many types of contests, including those offering product or service discounts or free merchandise. The present method may be used at trade shows to attract attention to a display or booth. The purchaser may instead be a potential purchaser of the product or service, whom it is hoped will make a purchase of the product or service. The card need only provide the purchaser information toward an electronic fulfillment site and a code, and my be a label, playing piece, coupon, booklet or other product insert or package component. The card may be printed in or carried in a product catalog or advertisement. The card may be provided in a magazine or newspaper as well. The card may instead be available in a point of sale display or for pickup in a store or other retail location or even available electronically, such as over the internet.

DETAILED DESCRIPTION OF THE PREFERRED EMBODIMENTS

Figure 1:
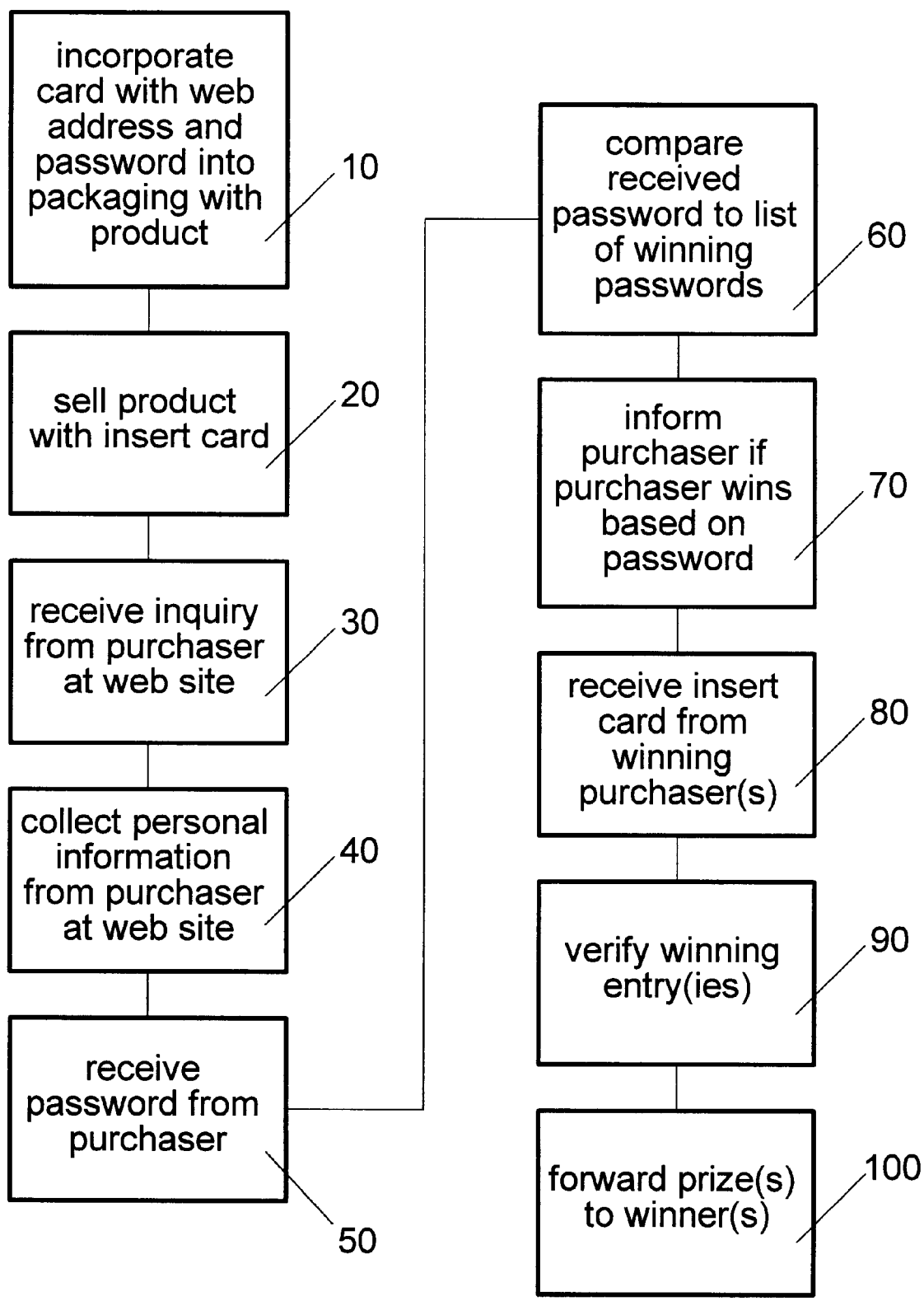
FIG. 1 is a flow chart of the process steps in an exemplary embodiment of the present invention.

In FIG. 1, the process of the invention is begun in step 10 by incorporating a card 12 provided with an internet address 14 and a code 16 into a package with a product 18. The step may be carried out by an apparatus such as the rotary transfer device disclosed in U.S. Pat. No. 5,431,274 which places the card 12 into or onto a product 18 package. Each product 18 in a production run is provided with a card 12 using the transfer device of the aforementioned patent, for example. Each of the cards 12 is provided with the internet address 14 and different codes 16, as will be described below. The incorporation of the card 12 into the product 18 packaging is accomplished by automated machinery which mounts the card by an adhesive, for example, on the product box or product container wherein it could be covered by wrapping such as shrink wrap. The card 12 may be inserted into the package, such as into the product box, or may be under a label as well. Instead of placing the card 12 in or on the product package, the card may be incorporated into the product package by being printed on the package, printed as part of a label or on the back of a label. The product, for purposes of the present invention may be a product or service catalog or advertisement and the card is provided in the catalog or advertizement, such as by being inserted into the catalog or by being printed on a catalog page, for example.

The card 12, for purposes of the present invention, may be a card formed of stiff paper or chipboard in the traditional sense, or a rigid or semi rigid plastic or other substrate, or may be a slip of paper, plastic piece, molded game piece, booklet or any type of playing piece, or it may be the back or inside of the label or box or a portion of the outside of the label or box, all of which are considered a card for purposes of the present invention. The intention is that the internet address 14 and code 16 information on the card 12, in whatever form it takes, is available to the customer who has the card 12. In a preferred embodiment, the card 12 is provided on the product 18 package is such as way as to only be available to the purchaser after the product 18 is purchased. Ideally, the outside of the product package 18 includes information announcing the contest or sweepstakes and indicating that the card 12 or other playing piece is enclosed.

The product 18 is any product or service that the seller, manufacturer distributor or promotional agency hopes to promote using the present method. The present method may also be used to promote the retail store selling the product. The product 18 for the present invention may be an advertisement or catalog for the product or service. The present method is not limited to promoting only the product 18 with which the card 12 is packaged, since the method may promote another product of the company, or a product or service of another company or may promote the company in general so as to further the good will of the company among its customers and potential customers.

Figure 2:
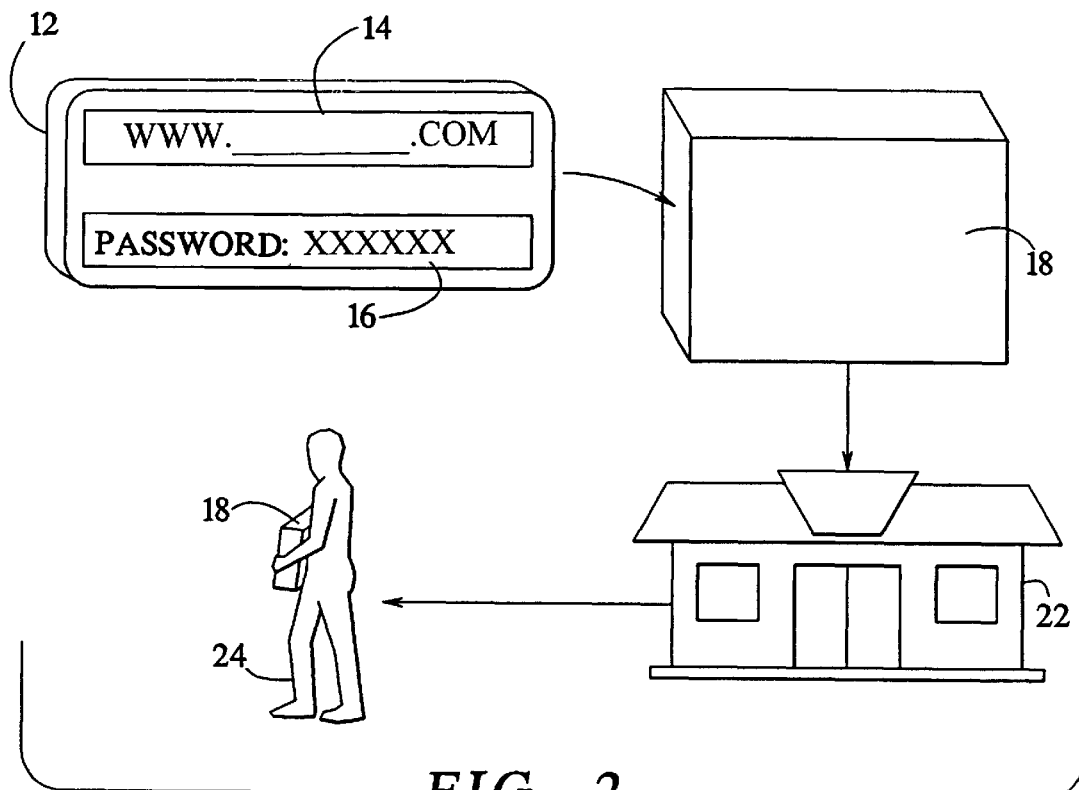
FIG. 2 is a diagram of a product sale according to the present method.

As shown in FIG. 2, the card 12 has been marked with the internet address 14 for an internet site, such as a world wide web site, at which is available custom developed web site for the contest or sweepstakes. The card has also been marked with the code or password 16 or other information. The code 16 may be unique to each card 12, or may be indicative of classes of applicants, such as one code for non-winning cards, another for a top level winner, and other of winners of second tier or lower prizes. Promotional information or other encoded information may also be marked on the card, including advertising, a discount coupon or other information.

Figure 3:
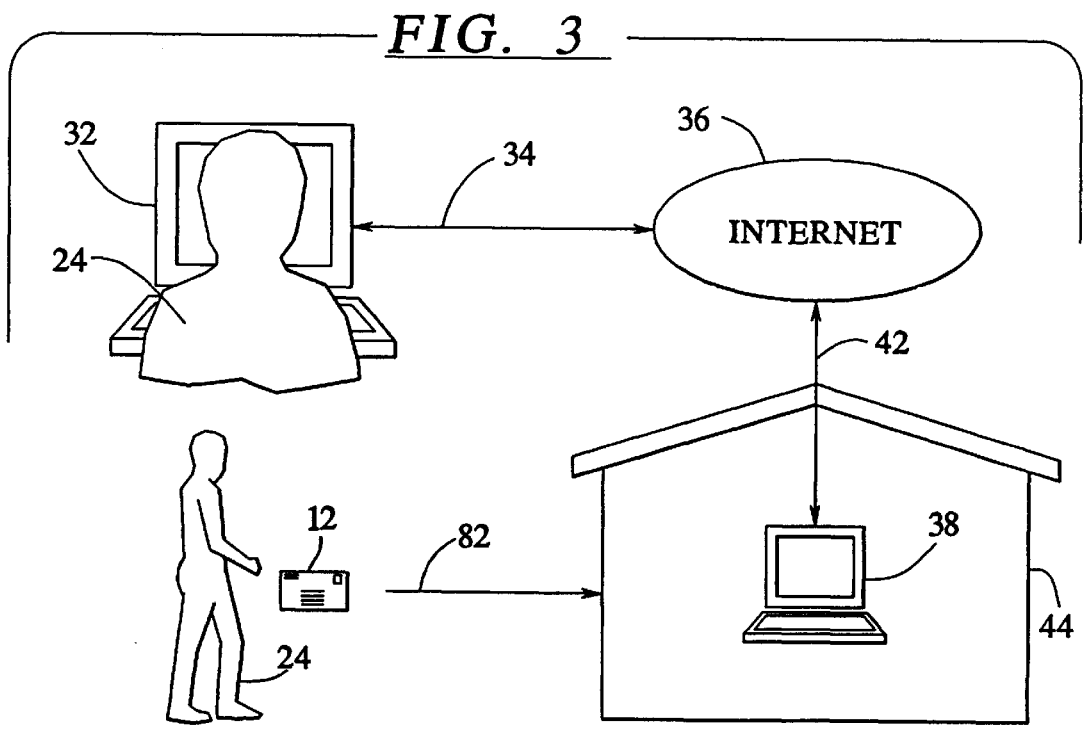
FIG. 3 is a diagram of a fulfillment of a contest according to the invention.

The product 18 with the enclosed card 12 is placed on the store shelf for sale by a retail seller as shown at step 20 in FIG. 1, and a customer is driven to purchasing the product 18 by the opportunity to participate in the contest or sweepstakes. The placement of the product 18 in the store 22 for sale is shown in FIG. 2. The store 22 may be a catalog company, wholesale outlet or other product source. The customer 24 purchases the product 18 and so becomes a purchaser. An individual may also become a purchaser according to the present invention by obtaining the card by mail, in a direct mail package, picking up the card 12 at a store, at a kiosk, or at a trade show. The purchaser removes the product 18 from the store 22 as shown in FIG. 2. After the sale of the product 18, the purchaser 24 finds the card 12 in the package and is motivated to use an internet enabled device, such as a computer, to contact the internet address 14 on the card 12. The contact from the purchaser is received by a server computer 38 at the internet address as shown at step 30, where the purchaser inquires as to whether the code 16 qualifies for a prize. This is also illustrated in FIG. 3 by the purchaser 24 at a computer 32 or other internet enabled device using the computer to connect over a connection 34, for example, a phone line or network, to the internet 36 and to a server computer 38 of the promoter or an agent of the promoter, such as an Internet service provider.

For purchasers who have no access to the internet address, an alternative may be provided wherein the purchaser returns to card by mail, for example. This enables all purchasers to participate in the sweepstakes, but is not preferred.

Before the server computer informs the purchaser 24 of the purchaser's status in the sweepstakes or contest, personal information is collected from the purchaser at the internet address as shown at step 40 in FIG. 1. This information is received over a connection 42 between the internet 36 and the promoter's server computer 38. The promoter's server computer 38 may be at the promoter's place of business 44 or another location. The personal information which the purchaser is asked to provide may include his or her name and address, and possibly other information such as his or her telephone number, age, income, race, zip code, e-mail address, interests, the store at which the product was purchased, comments on and evaluation of the product, etc. depending on the needs of the promoter. Either before or after collecting the personal information from the purchaser at step 40, the purchaser is asked for the code 16 from the card at step 50. The purchaser may be admitted to a secure area of the internet site upon inputting a valid code or password.

After receiving the code 16 and the personal information from the purchaser 24, the code 16 is compared to a list of winning codes to determine whether that code is a winner at some prize level, as shown at step 60. Alternately, the code 16 which is input by the purchaser 24 may be subject to some computation, random selection, or other means for determining a winning or non-winning status, instead of the look-up list. The purchaser 24 is then informed of his or her status based on the code 16, in other words, whether the purchaser 24 has won some prize, as shown at step 70.

A purchaser 24 who is visiting the internet site may be invited to play a game or participate in some other enjoyable activity as a means for further promoting the good will of the product or company. This activity may be restricted to those purchasers who have been admitted to the secure area of the site by inputting a valid code 16 or may be open to all visitors. The purchaser may also be directed to participation retailers in his or her area for additiond discounts and/or special promotions for the product and related products.

The purchasers 24 who are identified as winning a prize or other award are requested by the server computer 38 to send the original card 12 with the winning code to the company selling the product or the promoter running the sweepstakes, as shown in FIG. 3 at 82. The card 12 sent by mail, for example, by the purchaser 24 is received by the promoter at step 80 in FIG. 1. The winning status of the card 12 can be verified, as shown at 90. Security measures such as copy protection may be implemented to assure that copies of the winning card 12 are not acceptable by the promoter.

Fewer personnel are required by the promoter to receive the returned cards 12, since only the winning cards (and perhaps a few others) will be sent in. Further, and more importantly, the personnel for recording of the purchaser information is dispensed with since the purchasers input this information themselves. After verification of the original card 12, the prize or prizes corresponding to the prize levels won by the purchaser is then forwarded to the winning purchasers at step 100 in FIG. 1.

For purchasers 24 who did not win a prize and are not required to send the card 12 to the promoter, the card 12 may include a discount coupon or other promotion toward a future purchase. A rebate toward the purchase price may also be offered, and can be sent automatically to the address which the purchaser inputs, or otherwise credited to the purchaser or a discount forwarded to the seller. In this way, the present method also provides automatic fulfillment of rebate promotions.

After the personal information of the purchasers has been received at the promoter's internet site by the promoter's server computer 38, the information is preferably accumulated into a database where may be sorted and used for future product promotions, for focusing of advertising to the purchasers, or other marketing advantages.

For the present method, the purchaser 24 need not be the individual who actually made the purchase of the product 18, but may be a family member, coworker or friend or other person who obtained the card 12 or who otherwise is performing the steps described herein. The internet enabled device 32 used for the connection to the internet site need not be owned by the purchaser but may be used by the purchaser temporarily such as at a public library, at a business or at a friend's house. The promoter may be the manufacturer of the product 18, an advertising agency, an outside promoter, the retail seller or an agent thereof, or other entity assigned the task of performing the steps described herein. The internet site for which the address 14 is provided is preferably a site on the world wide web (WWW) portion of the internet, although it may be an FTP (file transfer protocol) site or some other type of site on the internet or on another computer network. For example, the present method may be performed over an on-line service, such as, America OnLine (AOL), or over any wide area network.

Thus, there is shown and described a method for fulfilling a promotional sweepstakes which reduces personnel expense on the part of the promoter by the participants inputting the fulfillment information directly into the promoter's database. The purchaser is informed immediately of his or her winning status, and the promoter is provided an opportunity to communicate directly with purchasers of the product.

Although other modifications and changes may be suggested by those skilled in the art, it is the intention of the inventors to embody within the patent warranted hereon all changes and modifications as reasonably and properly come within the scope of their contribution to the art.

I claim:

1. A process for product promotion, comprising the steps of:

providing a product or service;

providing sweepstakes information with said product or service, said sweepstakes information directing a purchaser or potential purchaser to a network address and including a unique code, said sweepstakes information being provided by at least one of modification of packaging of said product or service or modification of said product or service or incorporation of a card or piece into said packaging;

providing a site at said network address;

receiving an inquiry by said purchaser or potential purchaser at said network address;

receiving said unique code from said purchaser or potential purchaser;

obtaining purchaser or potential purchaser information from said purchaser or potential purchaser; and informing said purchaser or potential purchaser whether said purchaser or potential purchaser has won a prize based on said unique code while said purchaser or potential purchaser is connected at said site.

2. A process as claimed in claim 1, wherein step of providing said sweepstakes information with said product or service includes incorporating a card into packaging of said product, said card including said network address and said unique code.

3. A process as claimed in claim 1, wherein said network address is a world wide web address on the Internet.

4. A process as claimed in claim 1, wherein said network address is a wide area network address.

5. A process as claimed in claim 1, wherein said network address is an address in an on-line service.

6. A process as claimed in claim 1, wherein said product is a product for sale at a retail store.

7. A process as claimed in claim 1, wherein said product is a catalog.

8. A process as claimed in claim 1, wherein said step of identifying said purchaser or potential purchaser includes obtaining a name and street address of said purchaser or potential purchaser.

9. A process as claimed in claim 1, wherein said step of identifying said purchaser or potential purchaser includes obtaining an e-mail address of said purchaser or potential purchaser.

10. A process as claimed in claim 1, wherein said step of identifying said purchaser or potential purchaser includes obtaining a telephone number of said purchaser or potential purchaser.

11. A process as claimed in claim 1, wherein said step of identifying said purchaser or potential purchaser includes obtaining a postal zip code of said purchaser or potential purchaser.

12. A process as claimed in claim 1, further comprising the step of:

providing the purchaser or potential purchaser with a discount on subsequent purchases of said product or service.

13. A process as claimed in claim 1, further comprising the step of:

providing the purchaser or potential purchaser with a game to play while connected to said network address.

14. A process as claimed in claim 1, further comprising the step of:

collecting purchaser or potential purchaser identity information in a database.

15. A process as claimed in claim 14, further comprising the step of:

performing research on said database.

16. A process as claimed in claim 14, further comprising the step of:

sending promotional material to purchasers or potential purchasers in said database.

17. A process as claimed in claim 1, further comprising the steps of:

providing a secure area at said network address, obtaining said unique code from said purchaser or potential purchaser, and admitting said purchaser or potential purchaser to said secure area upon entry of a valid unique code.

18. A method for promoting a product or service, comprising the steps of:

providing a plurality of cards each marked with an Internet address and respective unique codes;

incorporating said plurality of cards into items provided to a purchaser upon purchase of said product or service;

providing said items to purchasers upon purchase of said product or service;

providing a site at said Internet address for access by said purchasers;

receiving inquiries from said purchasers at said site;

obtaining personal information from said purchasers at said site;

accumulating said personal information into a database;

receiving said unique codes from corresponding ones of said purchasers at said site; and informing each of said purchasers of a status based on said unique codes while each of said purchasers are connected at said site.

19. A method as claimed in claim 18, wherein said status is selected from the statuses of winning and non-winning.

20. A method as claimed in clam 18, further comprising the steps of:

receiving an original of at least one of said cards from said purchasers; and verifying said status corresponding to ones of said purchasers.

21. A method for product promotion, comprising the steps of:

providing a rebate promotion with a plurality of products or services offered for sale;

providing a unique code with each of said plurality of products or services, said step of providing said unique code including at least one of modification of said products or services, modification of packaging of said products or services, or incorporating a card or piece into packaging of said product or service;

providing information directing purchasers of said products or services to an electronic address;

accepting input of said unique codes from said purchasers;

verifying valid codes of purchasers accessing said electronic address while said purchasers are connected to said electronic address;

providing rebates to purchasers who input valid codes at said electronic address.

22. A method for product promotion, comprising the steps of:

providing a product or service for sale;

providing a unique code accompanying said product or service for sale by modification of said product or service, modification of packaging of said product or service, or incorporation of a card or piece into said product or service;

providing an electronic address for verifying said unique codes; and providing at least one of rebate, discount and sweepstakes promotion to purchasers of said product or service who input a verified unique code at said electronic address including informing said purchasers of a status of said at least one of said rebate, discount and sweepstakes promotion while each of said purchasers are connected at said electronic address.

* * * * *